United States Patent
Patel et al.

(10) Patent No.: US 7,686,939 B2
(45) Date of Patent: *Mar. 30, 2010

(54) CRYSTALLINE WAX (75) Inventors: Raj D. Patel, Oakville (CA); David J. Sanders, Oakville (CA); T Hwee Ng, Mississauga (CA); Stephan V. Drappel, Toronto (CA); Sandra J. Gardner, Oakville (CA); Sonja Hadzidedic, Etobicoke (YU); Louis V. Isganitis, Rochester, NY (US); Timothy L. Lincoln, Rochester, NY (US); Kevin F. Marcell, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 904 days.

This patent is subject to a terminal disclaimer.

(21) Appl. No.: 11/273,798

(22) Filed: Nov. 14, 2005

(65) Prior Publication Data

US 2007/0131580 A1    Jun. 14, 2007

(51) Int. Cl.
C10G 73/36 (2006.01)
(52) U.S. Cl. .............. 208/20; 430/108.8; 430/110; 430/111; 430/126; 430/131
(58) Field of Classification Search .............. 208/24, 208/20, 21; 430/108.4, 108.8, 110, 111, 430/126, 131
See application file for complete search history.

(56) References Cited

U.S. PATENT DOCUMENTS

| | | | |
|---|---|---|---|
| 4,418,108 A | 11/1983 | Lin | |
| 5,278,020 A | 1/1994 | Grushkin et al. | |
| 5,290,654 A | 3/1994 | Sacripante et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,348,832 A | 9/1994 | Sacripante et al. | |
| 5,364,729 A | 11/1994 | Kmiecik-Lawrynowicz et al. | |
| 5,366,841 A | 11/1994 | Patel et al. | |
| 5,370,963 A | 12/1994 | Patel et al. | |
| 5,403,693 A | 4/1995 | Patel et al. | |
| 5,405,728 A | 4/1995 | Hopper et al. | |
| 5,482,812 A | 1/1996 | Hopper et al. | |
| 5,496,676 A | 3/1996 | Croucher et al. | |
| 5,501,935 A | 3/1996 | Patel et al. | |
| 5,527,658 A | 6/1996 | Hopper et al. | |
| 5,585,215 A | 12/1996 | Ong et al. | |
| 5,622,806 A | 4/1997 | Veregin et al. | |
| 5,650,255 A | 7/1997 | Ng et al. | |
| 5,650,256 A | 7/1997 | Veregin et al. | |

(Continued)

FOREIGN PATENT DOCUMENTS

EP    0 276 147 A2    7/1988

(Continued)

*Primary Examiner*—Glenn Caldarola
*Assistant Examiner*—Prem C. Singh
(74) *Attorney, Agent, or Firm*—Carter, DeLuca, Farrell & Schmidt, LLP (57) ABSTRACT

Embodiments include a fractionated and/or distilled wax having from about 30 to about 64 carbon units, a degree of crystallinity as calculated by heat of melting and as measured by DSC of from about 55 to about 100, a Mw is from about 500 to about 800, and a polydispersity of from about 1 to about 1.05.

22 Claims, 4 Drawing Sheets

U.S. PATENT DOCUMENTS

| | | | |
|---|---|---|---|
| 5,723,253 A | 3/1998 | Higashino et al. | |
| 5,744,520 A | 4/1998 | Kmiecik-Lawrynowicz et al. | |
| 5,747,215 A | 5/1998 | Ong et al. | |
| 5,763,133 A | 6/1998 | Ong et al. | |
| 5,766,818 A | 6/1998 | Smith et al. | |
| 5,804,349 A | 9/1998 | Ong et al. | |
| 5,827,633 A | 10/1998 | Ong et al. | |
| 5,840,459 A | 11/1998 | Ohno et al. | |
| 5,840,462 A | 11/1998 | Foucher et al. | |
| 5,853,944 A | 12/1998 | Foucher et al. | |
| 5,863,695 A * | 1/1999 | Tanikawa et al. | 430/122.51 |
| 5,863,698 A | 1/1999 | Patel et al. | |
| 5,869,215 A | 2/1999 | Ong et al. | |
| 5,902,710 A | 5/1999 | Ong et al. | |
| 5,910,387 A | 6/1999 | Mychajlowskij et al. | |
| 5,916,725 A | 6/1999 | Patel et al. | |
| 5,919,595 A | 7/1999 | Mychajlowskij et al. | |
| 5,922,501 A | 7/1999 | Cheng et al. | |
| 5,925,488 A | 7/1999 | Patel et al. | |
| 5,977,210 A | 11/1999 | Patel et al. | |
| 5,994,020 A | 11/1999 | Patel et al. | |
| 6,020,101 A | 2/2000 | Sacripante et al. | |
| 6,120,967 A | 9/2000 | Hopper et al. | |
| 6,130,021 A | 10/2000 | Patel et al. | |
| 6,628,102 B2 | 9/2003 | Batson | |
| 6,632,577 B2 * | 10/2003 | Akashi et al. | 430/119.88 |
| 2004/0130054 A1 | 7/2004 | Riffer | |
| 2005/0130054 A1 | 6/2005 | Yuan et al. | |

FOREIGN PATENT DOCUMENTS

EP    1 688 799 A1    8/2006

* cited by examiner

CRYSTALLINE WAX

CROSS-REFERENCE TO RELATED APPLICATIONS

Attention is directed to commonly-assigned, currently pending U.S. patent application Ser. No. 11/273,895, filed Nov. 14, 2005, entitled, "Crystalline Wax;" U.S. patent application Ser. No. 11/273,748, filed Nov. 14, 2005, entitled, "Toner Having Crystalline Wax;" U.S. patent application Ser. No. 11/273,751, filed Nov. 14, 2005, entitled, "Toner Having Crystalline Wax;" U.S. patent application Ser. No. 11/274,459, filed Nov. 14, 2005, entitled, "Toner Having Crystalline Wax;" U.S. patent application Ser. No. 11/126,745, filed May 11, 2005, entitled, "Method of Purification of Polyalkylene Materials. " The disclosures of these patent applications are hereby incorporated by reference in their entirety.

BACKGROUND

The present disclosure is generally related to distilled or fractionated waxes referred to herein as wax or waxes that can be used in toners, and more specifically, to toners made by emulsion aggregation (EA) and coalescence processes. The waxes herein are crystalline waxes, and have a degree of crystallization. The resulting toners can be selected for known electrophotographic, electrostatographic, xerographic, and like imaging processes, including copying, printing, faxing, scanning, and like machines, and including digital, image-on-image, color, lithography, and like processes.

In reprographic technologies, such as xerographic and ionographic devices, it is desired to provide toners with high gloss. It is also desired to provide toners that can be used in an oil-less environment, and at low minimum fusing temperatures. It is further desired to provide toners that can be used in high-speed printing and/or copying and the like, machines.

Toners in accordance with embodiments herein, provide desired fusing characteristics including, for example, release characteristics such as a stripping force of less than about 30 to less than about 5 grams of force; blocking characteristics such as a high blocking temperature of about 45° C. to about 65° C.; document offset characteristics such as a document offset of about 2.0 to about 5.0; vinyl offset characteristics such as a vinyl offset of about 3.0 to about 5.0; and triboelectrical charging characteristics. Further, toners in embodiments herein, enable the use of lower minimum imaging fusing temperatures, such as from about 120° C. to about 170° C., enable high speed printing such as for machines running at greater than about 35 pages per minute. Further, the present toners, in embodiments, enable high image gloss, such as in an oil-less fuser system, while still retaining a high blocking temperature, high image gloss comprising of for example from about 30 to about 80 gloss units (GGU) as measured by the Gardner Gloss metering unit; for example on a coated paper, such as Xerox 120 gsm Digital Coated Gloss papers.

Illustrated in U.S. Pat. No. 5,994,020, the disclosure of which is totally incorporated herein by reference, are toner preparation processes, and more specifically, a process for the preparation of toner comprising: (i) preparing, or providing a colorant dispersion; (ii) preparing, or providing a functionalized wax dispersion comprised of a functionalized wax contained in a dispersant mixture comprised of a nonionic surfactant, an ionic surfactant, or mixtures thereof; (iii) shearing the resulting mixture of the functionalized wax dispersion (ii) and the colorant dispersion (i) with a latex or emulsion blend comprised of resin contained in a mixture of an anionic surfactant and a nonionic surfactant; (iv) heating the resulting sheared blend of (iii) below about the glass transition temperature (Tg) of the resin particles; (v) optionally adding additional anionic surfactant to the resulting aggregated suspension of (iv) to prevent, or minimize additional particle growth of the resulting electrostatically bound toner size aggregates during coalescence (iv); heating the resulting mixture of (v) above about the Tg of the resin; and optionally, (vii) separating the toner particles.

Emulsion/aggregation/coalescence processes for the preparation of toners are illustrated in a number of Xerox patents, the disclosures of each of which are totally incorporated herein by reference, such as U.S. Pat. No. 5,290,654, U.S. Pat. No. 5,278,020, U.S. Pat. No. 5,308,734, U.S. Pat. No. 5,370,963, U.S. Pat. No. 5,344,738, U.S. Pat. No. 5,403,693, U.S. Pat. No. 5,418,108, U.S. Pat. No. 5,364,729, and U.S. Pat. No. 5,346,797; and also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,863,698; 5,902,710; 5,910,387; 5,916,725; 5,919,595; 5,925,488; 5,977,210; 5,994,020; 6,020,101; 6,130,021; 6,120,967 and 6,628,102.

In addition, the following U.S. patents relate to emulsion aggregation processes of forming toner compositions, the disclosures of each of which are totally incorporated herein by reference.

U.S. Pat. No. 5,922,501 describes a process for the preparation of toner comprising blending an aqueous colorant dispersion and a latex resin emulsion, and which latex resin is generated from a dimeric acrylic acid, an oligomer acrylic acid, or mixtures thereof and a monomer; heating the resulting mixture at a temperature about equal, or below about the glass transition temperature (Tg) of the latex resin to form aggregates; heating the resulting aggregates at a temperature about equal to, or above about the Tg of the latex resin to effect coalescence and fusing of the aggregates; and optionally isolating the toner product, washing, and drying.

U.S. Pat. No. 5,482,812 describes a process for the preparation of toner compositions or toner particles comprising (i) providing an aqueous pigment dispersion comprised of a pigment, an ionic surfactant, and optionally a charge control agent; (ii) providing a wax dispersion comprised of wax, a dispersant comprised of nonionic surfactant, ionic surfactant or mixtures thereof; (iii) shearing a mixture of the wax dispersion and the pigment dispersion with a latex or emulsion blend comprised of resin, a counterionic surfactant with a charge polarity of opposite sign to that of said ionic surfactant, and a nonionic surfactant; (iv) heating the above sheared blend below about the glass transition temperature (Tg) of the resin to form electrostatically bound toner size aggregates with a narrow particle size distribution; (v) adding additional ionic surfactant to the aggregated suspension of (iv) to ensure that no, or minimal additional particle growth of the electrostatically bound toner size aggregates occurs on further increasing the temperature to coalesce the aggregates into toner particles (vi); (vi) heating the mixture of (v) with bound aggregates above about or at the Tg of the resin; and optionally (vii) separating the toner particles from the aqueous slurry by filtration and thereafter optionally washing.

U.S. Pat. No. 5,622,806 describes a process, for example, for the preparation of toner compositions with controlled particle size comprising (i) preparing a pigment dispersion in water, which dispersion is comprised of a pigment, an ionic surfactant in amounts of from about 0.5 to about 10 percent by weight to water, and an optional charge control agent; (ii)

shearing the pigment dispersion with a latex mixture comprised of a counterionic surfactant with a charge polarity of opposite sign to that of the ionic surfactant, a nonionic surfactant, and resin particles, thereby causing a flocculation or heterocoagulation of the formed particles of pigment, resin, and charge control agent; and (iii) stirring.

U.S. Patent Application Publication 2004/0130054 A1 discloses waxes used in inks and toners. The waxes have a melting point of 50 to 120° C., and a melting range of 5 to about 65° C.

BRIEF DESCRIPTION OF THE DRAWINGS

Reference may be had to the accompanying drawings, which include.

SUMMARY

Embodiments include a distilled wax having from about 30 to about 62 carbon units, a degree of crystallinity as calculated by heat of melting and as measured by DSC of from about 55 to about 100 percent, a Mw of from about 500 to about 800, and a polydispersity (Mw/Mn) of from about 1 to about 1.05.

Embodiments also include a crystalline wax having from about 30 to about 62 carbon units, a degree of crystallinity as calculated by heat of melting and as measured by DSC of from about 55 to about 100 percent, an Mw, Mn and Mp all in the range of from about 640 to about 725, and a polydispersity of from about 1 to about 1.05.

In addition, embodiments include a distilled crystalline wax having from about 30 to about 62 carbon units, a viscosity of from about 100 to about 10,000 centipoise at 92° C., a degree of crystallinity as calculated by heat of melting and as measured by DSC of from about 55 to about 100 percent, an Mw, Mn and Mp all three in the range of from about 640 to about 725, and a polydispersity of from about 1 to about 1.05.

DETAILED DESCRIPTION

In embodiments, there is disclosed a fractionated or distilled wax, and more specifically, a crystalline wax, and a toner comprising the wax. The wax can be selected from, for example, a polyolefin wax, an alkylene wax, a polyethylene wax, a polypropylene wax, a paraffin wax, a Fischer Tropsch wax, microcrystalline wax, carnauba wax, jojoba wax, rice wax, beeswax, montanic acid ester wax, castor wax, or mixtures thereof. In embodiments, the wax is a polyethylene wax or a Fischer Tropsch wax, and in specific embodiments, fractionated, crystalline, and/or distilled polyethylene wax. The polyethylene wax, in embodiments, is derived from ethylene polymerization.

The wax can be prepared using different catalysts including Ziegler-Natta, Fischer Tropsch, metallocene, and like catalysts. Details of how the wax can be made can be found in U.S. Patent Application Publication No. US 20050130054 A1 and U.S. Pat. No. 5,500,321, the subject matter of which is hereby incorporated by reference in the entirety for both of these references.

Figure 4:
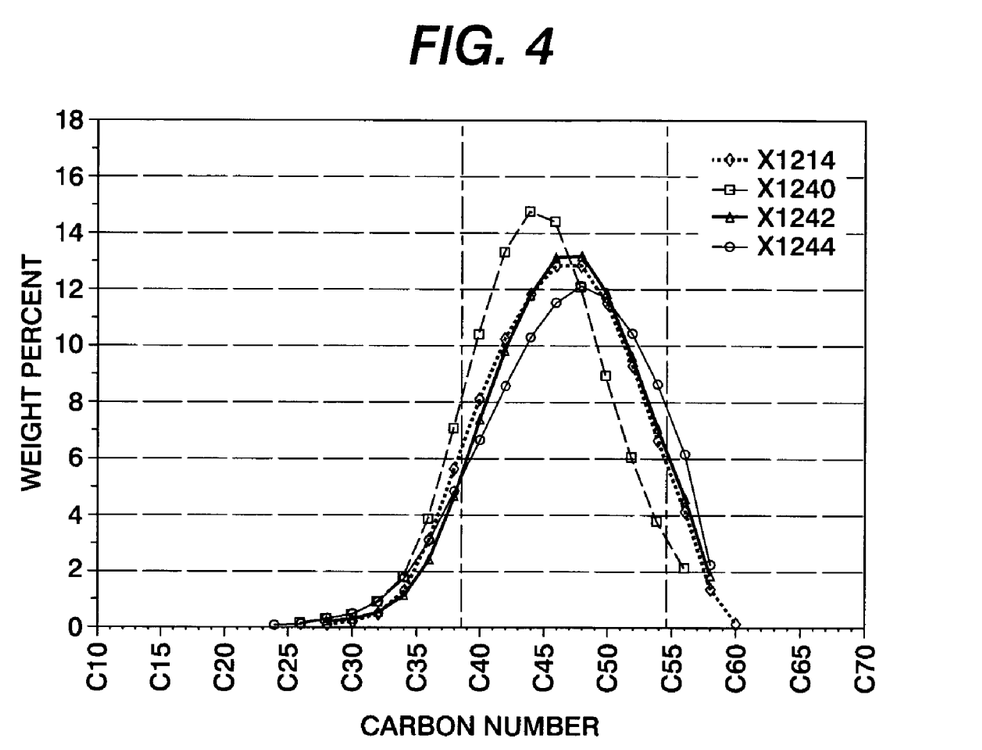
FIG. 4 is a graph of weight percent versus carbon number for a wax in accordance with an embodiment disclosed herein.

In embodiments, the number of carbon units for the wax ranges from about 30 to about 62 carbons, and the peak from about 42 to about 55. At 30 carbon units, the weight percent is at about 0.5 weight percent; while at 60 carbon units, the weight percent is at about 0.5 weight percent. The peak weight percent is less than or equal to 20 percent, or from about 1 to about 15 percent, as measured by a gas chromatograph. FIG. 4 represents a schematic of the distribution as well as peak ranges of the repeating carbon units.

In embodiments, the wax has a degree of crystallinity ($Xc$) as calculated by heat of melting or heat of fusion or enthalpy, and as measured by DSC, of from about 55 to about 100 percent, or from about 60 to about 98 percent, or from about 70 to about 95 percent, or from about 75 to about 90 percent.

Figure 1:
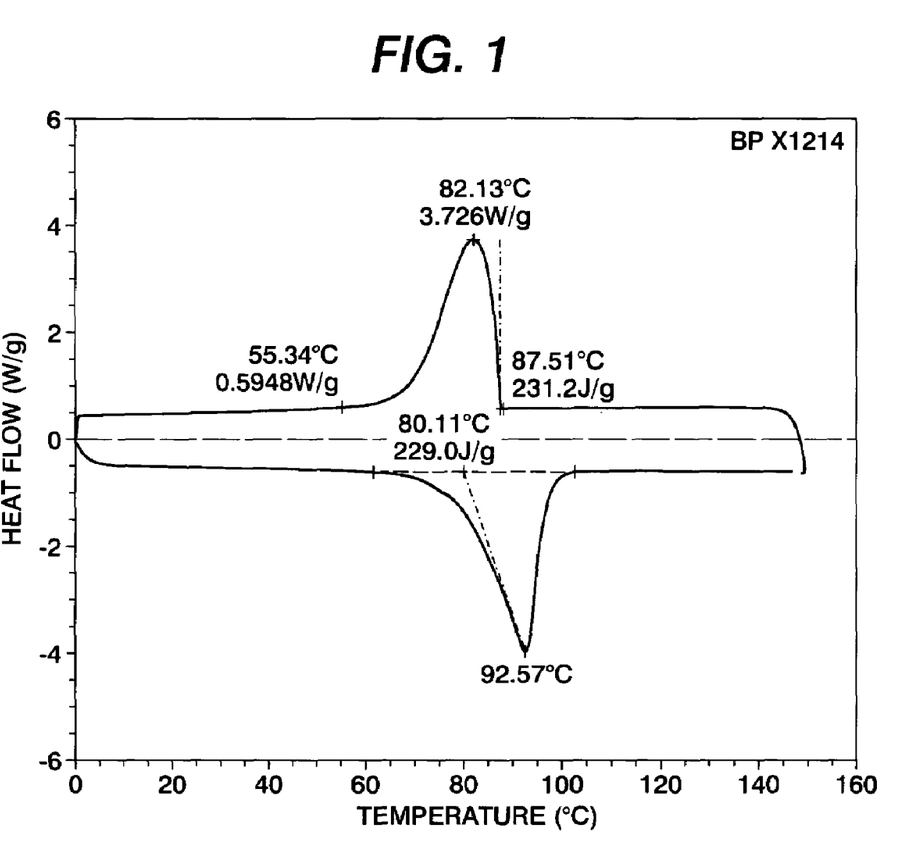
FIG. 1 is a DSC curve of heat flow versus temperature for a wax in accordance with an embodiment disclosed herein.

During the DSC, the heating rate is about 10° C./min and the melting enthalpy is greater than about 150 J/g and measured during the second scan as shown in FIG. 1. The percent crystallization is calculated from the following expression:

[Heat of enthalpy ($Hm$) J/g/294 J/g]×100=degree of crystallinity ($Xc$)

The wax also has a degree of crystallinity as measured on the cooling cycle or heat of recrystallization, of from about 55 to about 100 percent, or from about 60 to about 98 percent, or from about 70 to about 95 percent, or from about 75 to about 90 percent. The crystallinity is measured using the heat of recrystallization, and wherein the degree of crystallinity is calculated using the following formula:

[Heat of recrystallization ($Hrc$) J/g/294 J/g]×100=degree of crystallinity ($Xc$).

In embodiments, there is a difference between the crystallinity measured using the heat of enthalpy above, and the crystallinity as measured using the heat of recrystallization above of not more than about 15 percent, or from about 0.01 to about 15 percent; not greater than about 10 percent, or from about 0.01 to about 10 percent; not greater than about 5 percent, or from about 0.01 to about 5 percent; or not greater than about 1 percent, or from about 0.01 to about 1 percent.

The wax has a degree of crystallinity as measured by X-ray diffraction ($Xc$) of from about 55 to about 100 percent, or from about 60 to about 98 percent, or from about 70 to about 95 percent, or from about 75 to about 90 percent. The crystallinity is measured using X-ray diffraction, and the degree of crystallinity is calculated using the following formula:

$$Xc=[Sc/(Sc+Sa)]\times 100\%$$

wherein $Sc$ is a diffraction peak area of a crystalline component of the wax and the $Sa$ is a diffraction peak area of an amorphous component of the wax.

During coalescence of the aggregates comprising resin, colorant and wax, the temperature is above the resin Tg. Therefore, the temperature range selected results in a viscosity that allows the wax to flow in the resin matrix, allowing for the wax domains to be formed. The wax domains can be larger (for example, from about 0.5 to about 2 microns) than the starting size (for example, from about 0.15 to about 0.8 microns). The useful temperature range for the coalescence/fusion step is from about 92 to about 100° C. Waxes that have the proper flow properties to form the desired wax domains have viscosities that vary as a function of temperature such that they meet the requirements of the following equation:

$$\eta(cp) \leq 10^{27-0.25T} \text{ where } \leq 92° C. \ T \leq 100° C.$$

Figure 3:
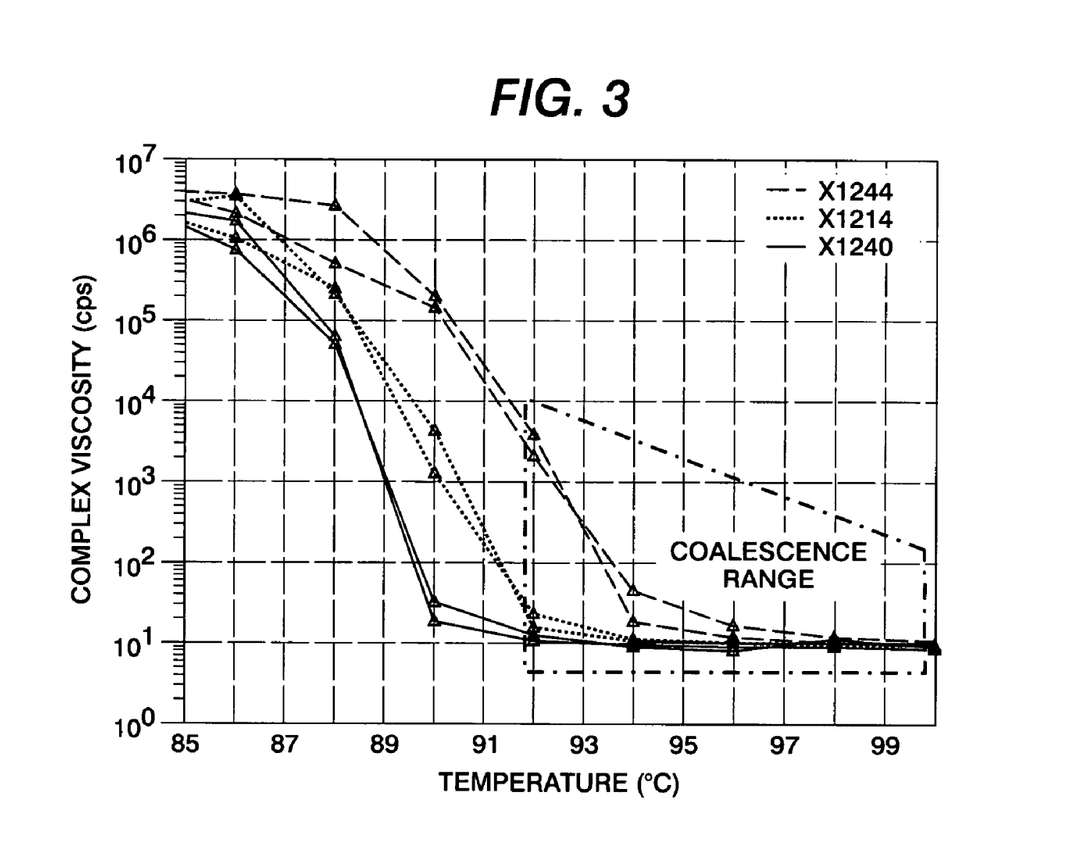
FIG. 3 is a graph of viscosity versus temperature and illustrates the useful coalescence temperature ranges and the slope provides a viscosity for a given temperature as defined by an equation in accordance with an embodiment disclosed herein.

This equation defines the upper bound to the viscosity of waxes, especially fractionated or distilled waxes, over the useful coalescence temperature range (see FIG. 3). In embodiments, the wax has a viscosity versus temperature relationship that meets the requirements of the equation.

The melt viscosity of the wax for example at 92° C. is less than or about 10,000 centipose, or from about 10 to about 10,000 centipoise, and the viscosity at 100° C. is less than or equal to 100 centipose, or from about 1 to about 100 centipoise, irrespective of the heating or the melting cycle. Furthermore the useful temperature for coalescence/fusion step can be lower than 92° C., for example as low as 88° C. when the peak carbon number is at less than or equal to 45. This should provide a melt viscosity ($\eta$) of less than or equal to 10,000 cps. In embodiments, the wax meets the criteria that fits the equation. Furthermore, in embodiments, the wax meets the enthalpy (Hc) or the recrystallization (Hrc).

The wax has an onset temperature of from about 65 to about 70° C., and an offset temperature of from about 95 to about 100° C., during the heat up cycle (i.e., melting), as measured by a DSC when the heating rate is 10° C./min.

The needle penetration point of the wax is from about 0.1 to about 10, or from about 0.5 to about 8, or from about 1 to about 5 dmm (decimillimeter). The needle penetration point can be measured in accordance with ASTM 1321, using K95500 Koehler Instruments digital penetrometer, or can be measured in other known ways.

The wax in a toner material is present, for example, in an amount of about 6 to about 30 percent, or from about 7 to about 20 percent by weight based upon the total weight of the composition.

Examples of waxes include those as illustrated herein, such as those of the aforementioned co-pending applications, polyolefins such as polypropylenes, polyethylenes, and the like, such as those commercially available from Allied Chemical and Baker Petrolite Corporation, wax emulsions available from Michaelman Inc. and the Daniels Products Company, Epolene N-15™ commercially available from Eastman Chemical Products, Inc., Viscol 550-P™, a low weight average molecular weight polypropylene available from Sanyo Kasei K.K., and similar materials. Examples of functionalized waxes include amines, amides, for example Aqua Superslip 6550™, Superslip 6530™ available from Micro Powder Inc.; fluorinated waxes, for example Polyfluo 190™, Polyfluo 200™, Polyfluo 523XF™, Aqua Polyfluo 411™, Aqua Polysilk 19™, Polysilk 14™ available from Micro Powder Inc.; mixed fluorinated, amide waxes, for example Microspersion 19™ also available from Micro Powder Inc.; imides, esters, quaternary amines, carboxylic acids or acrylic polymer emulsion, for example Joncryl 74™, 89™, 130™, 537™, and 538™, all available from SC Johnson Wax; chlorinated polypropylenes and polyethylenes available from Allied Chemical and Petrolite Corporation, and from SC Johnson Wax. Such waxes can optionally be fractionated or distilled to provide specific cuts that meet viscosity and/or temperature criteria wherein the upper limit of viscosity is 10,000 cps and the temperature upper limit is 100C.

In embodiments, the wax comprises a wax in the form of a dispersion comprising, for example, a wax having a particle diameter of about 100 nanometers to about 500 nanometers or about 100 nanometers to about 300 nanometers, water, and an anionic surfactant or a polymeric stabilize, and optionally a nonionic surfactant. In embodiments, the wax comprises polyethylene wax particles, such as POLYWAX® 655, POLYWAX® 850, POLYWAX® 725, POLYWAX® 500 (the POLYWAX® waxes being commercially available from Baker Petrolite) and, for example, fractionated/distilled waxes which are cuts of commercial POLYWAX® 655 designated here as X1214, X1240, X1242, X1244, and the like, but are not limited to POLYWAX® 655 cuts. Waxes providing a specific cut, that meet the viscosity/temperature criteria, wherein the upper limit of viscosity is 10,000 cps and the temperature upper limit is 100° C. can be used. The waxes can have a particle diameter in the range of from about 100 to about 500 nanometers, although not limited. Other examples include FT-100 waxes from Shell (SMDA), and FNP0092 from Nippon Seiro. The surfactant used to disperse the wax can be an anionic surfactant, although not limited thereto, such as, for example, Neogen RK® commercially available from Daiichi Kogyo Seiyaku or TAYCAPOWER® BN2060 commercially available from Tayca Corporation or Dowfax available from DuPont.

In embodiments, the wax has an onset melt temperature of from about 65 to about 75° C., and an offset temperature of from about 95 to about 100° C.

In embodiments, the wax has an Mn, Mw and Mp, and each and all may fall within the ranges of from about 500 to about 800, or from about 600 to about 750, or from about 640 to about 725. The wax has a polydispersity (Mw/Mn) of from about 1 to about 1.05.

Toners herein can include resins. The resin particles can be, in embodiments, styrene acrylates, styrene butadienes, styrene methacrylates, or polyesters, present in various effective amounts, such as from about 70 weight percent to about 98 weight percent, and more specifically, about 80 weight percent to about 92 weight percent based upon the total weight percent of the toner. The resin can be of small average particle size, such as from about 0.01 micron to about 1 micron in average volume diameter as measured by the Brookhaven nanosize particle analyzer. Other effective amounts of resin can be selected.

As used herein, a non-crosslinked resin is a resin that is substantially free of crosslinking, for example, a resin having substantially about zero percent cross linking to about 0.2 percent crosslinking, or a resin having less than about 0.1 percent crosslinking. A crosslinked resin refers for example, to a crosslinked resin or gel comprising, for example, about 0.3 to about 20 percent crosslinking.

In embodiments, the resin selected can be a non-crosslinked resin such as, for example, a non-crosslinked resin comprising styrene:butylacrylate:beta-carboxyethyl acrylate, although not limited to these monomers, wherein, for example, the non-crosslinked resin monomers are present in an amount of from about 40 to about 95 percent styrene, from about 5 to about 60 percent butylacrylate, and about 0.05 parts per hundred to about 10 parts per hundred beta-carboxyethyl acrylate; or from about 60 to about 85 percent styrene, from about 15 to about 40 percent butylacrylate, and about 1 part per hundred to about 5 parts per hundred beta-carboxyethyl acrylate, by weight based upon the total weight of the monomers.

For example, the resin may be selected to contain a carboxylic acid group selected, for example, from the group consisting of acrylic acid, methacrylic acid, itaconic acid, beta carboxy ethyl acrylate (beta CEA), fumaric acid, maleic acid, and cinnamic acid, and wherein, for example, a carboxylic acid is selected in an amount of from about 0.1 to about 10 weight percent of the total weight of the resin.

In embodiments, a second latex can be a high glass transition temperature (high Tg) resin comprising from about 40 to about 95 percent styrene, from about 5 to about 60 percent butylacrylate, and from about 0.05 parts per hundred to about 10 parts per hundred beta-carboxyethyl acrylate; or from about 65 to about 90 percent styrene, from about 10 to about 35 percent butyl acrylate, and from about 1 part per hundred to about 5 parts per hundred beta-carboxyethyl acrylate by weight based upon the total weight of the monomers.

In further embodiments, the process provides a first resin (resin A) comprising a non-crosslinked resin having a first Tg of about 46° C. to about 56° C., about 48° C. to about 54° C., or about 51° C., and a second non-crosslinked resin (resin B) having a high Tg (high Tg being for example a glass transition temperature that is from about 5° C. to about 10° C. higher than the Tg of the first resin) of for example, at Tg of about 54° C. to about 65° C., about 56° C. to about 64° C., or about 59° C.

Illustrative examples of latex polymer or resin particles include known polymers selected from the group consisting of styrene acrylates, styrene methacrylates, butadienes, isoprene, acrylonitrile, acrylic acid, methacrylic acid, beta-carboxy ethyl acrylate, polyesters, poly(styrene-butadiene), poly(methyl styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methyl styrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butyl acrylate-acrylic acid), poly(styrene-butyl acrylate-methacrylic acid), poly(styrene-butyl acrylate-acrylonitrile), poly(styrene-butyl acrylate-acrylonitrile-acrylic acid), and styrene/butyl acrylate/carboxylic acid terpolymers, styrene/butyl acrylate/beta-carboxy ethyl acrylate terpolymers, PLIOTONE™ available from Goodyear, and mixtures thereof. The latex emulsion resin and the optional second latex resin selected can comprise the same resin or different resins.

The resin particles selected can be prepared by, for example, emulsion polymerization techniques, including semicontinuous emulsion polymerization methods, and the monomers used in such processes can be selected from, for example, styrene, acrylates, methacrylates, butadiene, isoprene, and optionally acid or basic olefinic monomers, such as acrylic acid, methacrylic acid, acrylamide, methacrylamide, quaternary ammonium halide of dialkyl or trialkyl acrylamides or methacrylamide, vinylpyridine, vinylpyrrolidone, vinyl-N-methylpyridinium chloride, and the like. The presence of acid or basic groups in the monomer or polymer resin is optional, and such groups can be present in various amounts of from about 0.1 to about 10 percent by weight of the polymer resin. Chain transfer agents, such as dodecanethiol or carbon tetrabromide, can also be selected when preparing resin particles by emulsion polymerization. Other processes of obtaining resin particles of from about 0.01 micron to about 1 micron can be selected from polymer microsuspension process, such as illustrated in U.S. Pat. No. 3,674,736, the disclosure of which is totally incorporated herein by reference, polymer solution microsuspension process, such as disclosed in U.S. Pat. No. 5,290,654, the disclosure of which is totally incorporated herein by reference, mechanical grinding process, or other known processes.

In embodiments, the toner processes disclosed herein comprise preparing a non-crosslinked latex resin (resin A) comprising, for example, styrene:butylacrylate:beta-carboxyethyl acrylate (monomers A, B, and C), by emulsion polymerization, in the presence of an initiator, a chain transfer agent, and surfactant. The amount and composition of the resin monomers comprise, for example, from about 70 to about 90 percent styrene, from about 10 to about 30 percent butyl acrylate, and from about 0.5 to about 10 parts per hundred beta-carboxyethyl acrylate, or from about 76.5 percent styrene, 23.5 percent butyl acrylate, and 3 parts per hundred beta-carboxyethyl acrylate. The amounts of initiator, such as for example, sodium persulfate, potassium persulfate, or ammonium persulfate, can be selected in the range of from about 0.5 to about 5.0 percent by weight of the monomers. The amount of chain transfer agent used can be selected in the range of from about 0.5 to about 5.0 percent by weight of the monomers A and B. The surfactant can be an anionic surfactant, and can be selected in the range of from about 0.7 to about 5.0 percent by weight of the aqueous phase. For example, the monomers are polymerized under starve fed conditions as referred to in Xerox patents such as U.S. Pat. No. 6,447,974, U.S. Pat. No. 6,576,389, U.S. Pat. No. 6,617,092, and U.S. Pat. No. 6,664,017, which are hereby totally incorporated by reference herein, to provide latex resin particles having a diameter in the range of from about 100 to about 300 nanometers. The molecular weight of the latex resin A can be, for example, about 30,000 to about 37,000, although not limited. The onset glass transition temperature (Tg) of the resin A is from about 46° C. to about 56° C., from about 48° C. to about 54° C., or about 51° C. The amount of carboxylic acid groups can be selected at from about 0.05 to about 5.0 parts per hundred of the resin monomers A and B. The molecular weight of the resin A obtained is about 34,000, and the molecular number is about 11,000, providing a non-crosslinked latex resin A having a pH of about 2.0.

A high Tg non-crosslinked latex resin (resin B) can be selected comprising styrene:butylacrylate:beta-carboxyethyl acrylate, again termed herein monomers A, B, and C, by an emulsion polymerization, in the presence of initiator, a chain transfer agent, and surfactant. In embodiments, the composition of the monomers A:B:C can be selected as comprising from about 70 to about 90 percent styrene, from about 10 to about 30 percent butylacrylate, and from about 0.05 parts per hundred to about 10 parts per hundred beta-carboxyethyl acrylate, or about 81.7% styrene, about 18.3% butyl acrylate, and about 3.0 parts per hundred beta-carboxyethyl acrylate. The amounts of initiator, such as sodium or ammonium persulfate, can be selected, for example, in the range of from about 0.5 to about 3.0 percent by weight of the monomers. The amount of chain transfer agent used can be selected, for example, in the range of from about 0.5 to about 3.0 percent by weight based upon the weight of the monomers A and B. The surfactant used can be an anionic surfactant, and can be selected in the range of from about 0.7 to about 5.0 percent by weight of the aqueous phase. The emulsion polymerization is conducted under a starve fed polymerization as referenced, for example, in the Xerox patents referred to above, to provide latex resin particles which are selected in the size range of from about 100 nanometers to about 300 nanometers volume average particle diameter. The molecular weight of the latex resin B is from about 30,000 to about 40,000, or from about 34,000, the molecular number is about 11,000, providing a non-crosslinked latex resin B having a pH of about 2.0. The onset Tg of the high Tg resin B is from about 5° C. to about 10° C. higher than the Tg of resin A, or alternately, from about 54° C. to about 65° C., from about 56° C. to about 64° C., or about 59° C. The amount of carboxylic acid groups can be selected at from about 0.05 to about 5.0 parts per hundred of the resin monomers A and B.

Examples of anionic surfactants suitable for use in the resin latex dispersion can include, for example, sodium dodecylsulfate (SDS), sodium dodecylbenzene sulfonate, sodium dodecylnaphthalene sulfate, dialkyl benzenealkyl, sulfates and sulfonates, adipic acid, available from Aldrich, NEOGEN RK™, NEOGEN SC™ from Daiichi Kogyo Seiyaku or TAYCAPOWER BN2060 commercially available from Tayca Corporation or Dowfax available from DuPont and the like. An effective concentration of the anionic surfactant generally employed can be, for example, from about 0.01 to about 10 percent by weight, and more specifically, from about 0.1 to about 5 percent by weight of monomers used to prepare the toner polymer resin.

Examples of nonionic surfactants that can be included in the resin latex dispersion include, for example, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, available from Rhodia as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. A suitable concentration of the nonionic surfactant can be, for example, from about 0.01 to about 10 percent by weight, or from about 0.1 to about 5 percent by weight of monomers used to prepare the toner polymer resin. The pigment dispersion can comprise pigment particles dispersed in an aqueous medium with a nonionic dispersant/surfactant. A dispersant having the same polarity as that of the resin latex dispersion can also be used.

Examples of additional surfactants, which may be added optionally to the aggregate suspension prior to or during the coalescence to, for example, prevent the aggregates from growing in size, or for stabilizing the aggregate size, with increasing temperature can be selected from anionic surfactants such as sodium dodecylbenzene sulfonate, sodium dodecylnaphthalene sulfate, dialkyl benzenealkyl, sulfates and sulfonates, adipic acid, available from Aldrich, NEOGEN R™, NEOGEN SC™ available from Daiichi Kogyo Seiyaku, and the like, among others.

Examples of the acids that can be used include, for example, nitric acid, sulfuric acid, hydrochloric acid, acetic acid, citric acid, trifluro acetic acid, succinic acid, salicylic acid and the like, and which acids are in embodiments utilized in a diluted form in the range of from about 0.5 to about 10 weight percent by weight of water, or in the range of from about 0.7 to about 5 weight percent by weight of water.

Introducing the sequestering or complexing component comprises in embodiments, introducing an organic complexing component selected from the group consisting of ethylenediaminetetraacetic acid, gluconal, sodium gluconate, potassium citrate, sodium citrate, nitrotriacetate salt, humic acid, and fulvic acid; salts of ethylenediaminetetraacetic acid, gluconal, sodium gluconate, potassium citrate, sodium citrate, nitrotriacetate salt, humic acid, and fulvic acid, alkali metal salts of ethylenediaminetetraacetic acid, gluconal, sodium gluconate, potassium citrate, sodium citrate, nitrotriacetate salt, humic acid, and fulvic acid; sodium salts of ethylenediaminetetraacetic acid, gluconal, sodium gluconate, tartaric acid, gluconic acid, oxalic acid, polyacrylates, sugar acrylates, citric acid, potassium citrate, sodium citrate, nitrotriacetate salt, humic acid, and fulvic acid; potassium salts of ethylenediaminetetraacetic acid, gluconal, sodium gluconate, potassium citrate, sodium citrate, nitrotriacetate salt, humic acid, and fulvic acid; and calcium salts of ethylenediaminetetraacetic acid, gluconal, sodium gluconate, potassium citrate, sodium citrate, nitrotriacetate salt, humic acid, fulvic acid, calcium disodium ethylenediaminetetraacetate dehydrate, diammoniumethylenediaminetetraacetic acid, pentasodium diethylenetriaminepentaacetic acid sodium salt, trisodium N-(hydroxyethyl)-ethylenediaminetriacetate, polyasparic acid, diethylenetriamine pentaacetate, 3-hydroxy-4-pyridinone, dopamine, eucalyptus, iminodisuccinic acid, ethylenediaminedisuccinate, polysaccharide, sodium ethylenedinitrilotetraacetate, nitrilo triacetic acid sodium salt, thiamine pyrophosphate, farnesyl pyrophosphate, 2-aminoethylpyrophosphate, hydroxylethylidene-1,1-diphosphonic acid, aminotrimethylenephosphonic acid, diethylene triaminepentamethylene phosphonic acid, ethylenediamine tetramethylene phosphonic acid, and mixtures thereof. For example, introducing the sequestering or complexing component in (vii) can comprise in embodiments introducing an organic complexing component comprising ethylenediaminetetraacetic acid, and the like.

Inorganic complexing components can be selected from the group consisting of sodium silicate, potassium silicate, magnesium sulfate silicate, sodium hexameta phosphate, sodium polyphosphate, sodium tripolyphosphate, sodium trimeta phosphate, sodium pyrophosphate, bentonite, and talc, and the like. Organic and inorganic complexing components can be selected in an amount of about 0.01 weight percent to about 10.0 weight percent, or from about 0.4 weight percent to about 4.0 weight percent based upon the total weight of the toner.

Other examples of coagulants include cationic surfactant, for example, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, MIRAPOL and ALKAQUAT available from Alkaril Chemical Company, SANIZOL B (benzalkonium chloride), available from Kao Chemicals, and the like, and mixtures thereof.

Inorganic cationic coagulants include, for example, poly-aluminum chloride (PAC), poly-aluminum sufosilicate, aluminum sulfate, zinc sulfate, magnesium sulfate, chlorides of magnesium, calcium, zinc, beryllium, aluminum, sodium, other metal halides including monovalent and divalent halides. The coagulant can be present in an aqueous medium in an amount of from, for example, from about 0.05 to about 10 percent by weight, or from about 0.075 to about 5.0 percent by weight of total solids in the toner. The coagulant may also contain minor amounts of other components, for example nitric acid.

In a further aspect of the invention, the coagulant may comprise a mixture of both an inorganic and an organic coagulant including, for example, PAC and SANIZOL B, aluminum sulfate and SANIZOL B, etc. Such mixtures of coagulants are also preferably used in an aqueous medium, each present in an amount of from, for example, from about 0.05 to about 5.0 percent by weight of total solids in the toner.

A colorant dispersion is selected, for example, comprising a cyan, magenta, yellow, or black pigment dispersion of each color in an anionic surfactant or optionally a non-ionic dispersion to provide, for example, pigment particles having a volume average particle diameter size selected of from about 50 nanometers to about 500 nanometers. The surfactant used to disperse each colorant, can be, for example, an anionic surfactant such as Neogen RK™. An Ultimaizer equipment can be used to provide the pigment dispersion, although media mill or other means can be utilized.

The toner can also comprise a colorant. Suitable colorants include pigments, dyes, mixtures of pigments and dyes, mixtures of pigments, mixtures of dyes, and the like. In embodiments, the colorant comprises carbon black, magnetite, black, cyan, magenta, yellow, red, green, blue, brown, mixtures thereof, selected for example, in an amount of from about 1 to about 25 percent by weight based upon the total weight of the composition.

Colorants can be selected in the form of a pigment dispersion comprising pigments particles having a size in the range of from about 50 to about 500 nanometers, water, and an anionic surfactant or polymeric stabilizer.

In some instances, pigments are available in the wet cake or concentrated form containing water, and can be easily dispersed utilizing a homogenizer, or simply by stirring, ball milling, attrition, or media milling. In other instances, pigments are available only in a dry form, whereby dispersion in water is effected by microfluidizing using, for example, a M-110 microfluidizer or an Ultimaizer and passing the pigment dispersion from about 1 to about 10 times through the chamber, or by sonication, such as using a Branson 700 sonicator, or a homogenizer, ball milling, attrition, or media milling with the optional addition of dispersing agents such as the aforementioned ionic or nonionic surfactants. In the instance of preparing carbon black pigment or other pigment dispersion, the above techniques can also be applied in the presence of a surfactant.

Specific colorants that may be used include, Paliogen Violet 5100 and 5890 (BASF), Normandy Magenta RD-2400 (Paul Ulrich), Permanent Violet VT2645 (Paul Ulrich), Heliogen Green L8730 (BASF), Argyle Green XP-111-S (Paul Ulrich), Brilliant Green Toner GR 0991 (Paul Ulrich), Lithol Scarlet D3700 (BASF), Toluidine Red (Aldrich), Scarlet for Thermoplast NSD Red (Aldrich), Lithol Rubine Toner (Paul Ulrich), Lithol Scarlet 4440, NBD 3700 (BASF), Bon Red C (Dominion Color), Royal Brilliant Red RD-8192 (Paul Ulrich), Oracet Pink RF (Ciba Geigy), Paliogen Red 3340 and 3871K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Ulrich), Paliogen Yellow 152 and 1560 (BASF), Lithol Fast Yellow 0991K (BASF), Paliotol Yellow 1840 (BASF), Novaperm Yellow FGL (Hoechst), Permanerit Yellow YE 0305 (Paul Ulrich), Lumogen Yellow D0790 (BASF), Suco-Gelb 1250 (BASF), Suco-Yellow D1355 (BASF), Suco Fast Yellow D1165, D1355 and D1351 (BASF), Hostaperm Pink E (Hoechst), Fanal Pink D4830 (BASF), Cinquasia Magenta (DuPont), Paliogen Black L9984 9BASF), Pigment Black K801 (BASF) and particularly carbon blacks such as REGAL® 330 (Cabot), Carbon Black 5250 and 5750 (Columbian Chemicals), and the like or mixtures thereof.

Additional useful colorants include pigments in water-based dispersions such as those commercially available from Sun Chemical, for example SUNSPERSE BHD 6011 (Blue 15 Type), SUNSPERSE BHD 9312 (Pigment Blue 15), SUNSPERSE BHD 6000 (Pigment Blue 15:3 74160), SUNSPERSE GHD 9600 and GHD 6004 (Pigment Green 7 74260), SUNSPERSE QHD 6040 (Pigment Red 122), SUNSPERSE RHD 9668 (Pigment Red 185), SUNSPERSE RHD 9365 and 9504 (Pigment Red 57, SUNSPERSE YHD 6005 (Pigment Yellow 83), FLEXIVERSE YFD 4249 (Pigment Yellow 17), SUNSPERSE YHD 6020 and 6045 (Pigment Yellow 74), SUNSPERSE YHD 600 and 9604 (Pigment Yellow 14), FLEXIVERSE LFD 4343 and LFD 9736 (Pigment Black 7) and the like or mixtures thereof. Other useful water-based colorant dispersions include those commercially available from Clariant, for example, HOSTAFINE Yellow GR, HOSTAFINE Black T and Black TS, HOSTAFINE Blue B2G, HOSTAFINE Rubine F6B and magenta dry pigment such as Toner Magenta 6BVP2213 and Toner Magenta EO2 which can be dispersed in water and/or surfactant prior to use.

Other useful colorants include, magnetites, such as Mobay magnetites M08029, M08960; Columbian magnetites, MAPICO BLACKS and surface treated magnetites; Pfizer magnetites CB4799, CB5300, CB5600, MCX6369; Bayer magnetites, BAYFERROX 8600, 8610; Northern Pigments magnetites, NP-604, NP-608; Magnox magnetites TMB-100 or TMB-104; and the like or mixtures thereof. Specific additional examples of pigments include phthalocyanine HELIOGEN BLUE L6900, D6840, D7080, D7020, PYLAM OIL BLUE, PYLAM OIL YELLOW, PIGMENT BLUE 1 available from Paul Ulrich & Company, Inc., PIGMENT VIOLET 1, PIGMENT RED 48, LEMON CHROME YELLOW DCC 1026, E.D. TOLUIDINE RED and BON RED C available from Dominion Color Corporation, Ltd., Toronto, Ontario, NOVAPERM YELLOW FGL, HOSTAPERM PINK E from Hoechst, and CINQUASIA MAGENTA available from E.I. DuPont de Nemours & Company, and the like. Examples of magentas include, for example, 2,9-dimethyl substituted quinacridone and anthraquinone dye identified in the Color Index as C160710, CI Dispersed Red 15, diazo dye identified in the Color Index as C126050, CI Solvent Red 19, and the like or mixtures thereof. Illustrative examples of cyans include copper tetra(octadecyl sulfonamide) phthalocyanine, x-copper phthalocyanine pigment listed in the Color Index as CI74160, CI Pigment Blue, and Anthrathrene Blue identified in the Color Index as D169810, Special Blue X-2137, and the like or mixtures thereof. Illustrative examples of yellows that may be selected include diarylide yellow 3,3-dichlorobenzidene acetoacetanilides, a monoazo pigment identified in the Color Index as CI12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,4-dimethoxy acetoacetanilide, and Permanent Yellow FGL. Colored magnetites, such as mixtures of MAPICO BLACK and cyan components may also be selected as pigments.

The toner may also include known charge additives in effective amounts such as, from about 0.1 to about 5 weight percent, such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, and the like.

Surface additives that can be added to the toner compositions after washing or drying include, for example, metal salts, metal salts of fatty acids, colloidal silicas, metal oxides, mixtures thereof, and the like, which additives are usually present in an amount of from about 0.1 to about 2 weight percent, reference U.S. Pat. Nos. 3,590,000, 3,720,617, 3,655,374 and 3,983,045, the disclosures of which are totally incorporated herein by reference. Examples of suitable additives include zinc stearate and AEROSIL R972® available from Degussa in amounts of from about 0.1 to about 2 percent which can be added during the aggregation process or blended into the formed toner product.

Also provided herein are developer and imaging processes, including a process for preparing a developer comprising preparing a toner composition with the toner processes illustrated herein and mixing the resulting toner composition with a carrier. Developer compositions can be prepared by mixing the toners obtained with the processes of the present disclosure with known carrier particles, including coated carriers, such as steel, ferrites, and the like, reference U.S. Pat. Nos. 4,937,166 and 4,935,326, the disclosures of which are totally incorporated herein by reference, using, for example from about 2 to about 8 percent toner concentration. The carriers selected may also contain dispersed in the polymer coating a conductive compound, such as a conductive carbon black and which conductive compound is present in various suitable amounts, such as from about 15 to about 65, or from about 20 to about 45 weight percent by weight of total solids.

Imaging methods are also envisioned as part of the present disclosure, reference for example a number of the patents mentioned herein, and U.S. Pat. No. 4,265,660, the disclosure of which is totally incorporated by reference herein. Imaging processes comprise, for example, preparing an image with an electrophotographic or xerographic device comprising a charging component, an imaging component, a photoconductive component, a developing component, a transfer component, and a fusing component; and wherein the development component comprises a developer prepared by mixing a carrier with a toner composition prepared with the toner processes illustrated herein; an imaging process comprising preparing an image with an electrophotographic or xerographic device comprising a charging component, an imaging component, a photoconductive component, a developing component, a transfer component, and a fusing component; wherein the development component comprises a developer prepared by mixing a carrier with a toner composition prepared with the toner processes illustrated herein; and wherein the electrophotographic or xerographic device comprises a high speed printer, a black and white high speed printer, a color printer, or combinations thereof.

The size of the toner particles can be, for example, from about 1 to about 25 microns, from about 3 microns to about 9 microns, more specifically, from about 4 microns to about 6 microns or about 5 microns.

The following Examples are being submitted to further define various species of the present disclosure. These Examples are intended to be illustrative only and are not intended to limit the scope of the present disclosure. Also, parts and percentages are by weight unless otherwise indicated.

EXAMPLES

Example 1

Testing of Wax for Molecular Weight Distributions

Commercial Polyethylene waxes such as POLYWAX® 655, POLYWAX 550, POLYWAX® 725, and the like available from Baker Petrolite, and in particular POLYWAX® 655 samples, were fractionated/distilled to provide the following examples. Examples include X1211, X1241, X1240, X1242, X1244 and X1214 (not shown here) from Baker Petrolite. The wax samples were then dissolved in 1,2,4-trichlorobenzene (TCB) at 120° C. and injected as dissolved (about 7 mg/ml). The injection size was about 100 microliters. The samples were held at 90° C. in the autosampler and then heated to 140° C. for about 2 hours before injection.

A mobile phase of the 1,2,4-trichlorobenzene (TCB) and two polymer labs 3 microns Mixed-E columns were used for the separation. The samples were analyzed on the Polymer Labs 220HT system using refractive index detection for molecular weight distribution. The entire system was heated to 140° C. The results are shown below in Table 1.

TABLE 1

| Sample | Mp | Mn | Mw | PDI |
| --- | --- | --- | --- | --- |
| X 1211 | 714 | 693 | 709 | 1.02 |
| X 1240 | 645 | 632 | 646 | 1.02 |
| X 1242 | 676 | 655 | 671 | 1.02 |
| X 1244 | 699 | 675 | 692 | 1.02 |

Example 2

Testing of Wax for Degree of Crystallinity Using Cooling Cycle

The fractionated and/or distilled wax also was determined to have a degree of crystallinity as measured on the cooling cycle of from about 100 to about 55° C. These measurements were under the conditions wherein the cooling rate was 2° C./min (first scan). The heat of recrystallization (Hrc) in J/g during cooling was equal to or greater than 150 J/g (see FIG. 1). The percent crystallinity was then calculated from the following expression:

[heat of recrystallization $(Hrc)$ J/g/295 J/g]×100=degree of crystallinity $(Xc)$.

As per FIG. 1, the heat evolved during recrystallization is 231.2 J/g when integrated between the specified temperatures. This resulted in a crystallinity of 78.4%

Testing of Wax for Degree of Crystallinity Second Heat—Heat of Enthalpy (Hm)

The wax also was determined to have a degree of crystallinity as measured on the cooling cycle of from about 60 to about 100° C. These measurements were under the conditions wherein the heating rate was 10° C./min (second scan). The heat of enthalpy (Hm) in J/g during heating was equal to or greater than 150 J/g (see FIG. 1). The percent crystallinity was then calculated from the following expression:

[Heat of enthalpy $(Hm)$ j/g/294 (j/g)]×100=degree of crystallinity $(Xc)$

As per FIG. 1, the heat enthalpy during heating was 229.0 J/g when integrated between the specified temperatures. This resulted in a crystallinity of 77.9 percent.

FIG. 1 demonstrates the results of testing of BP X1214 from Baker Petrolite.

Example 3

Testing of Wax for Degree of Crystallinity Using X-Ray Diffraction

Figure 2:
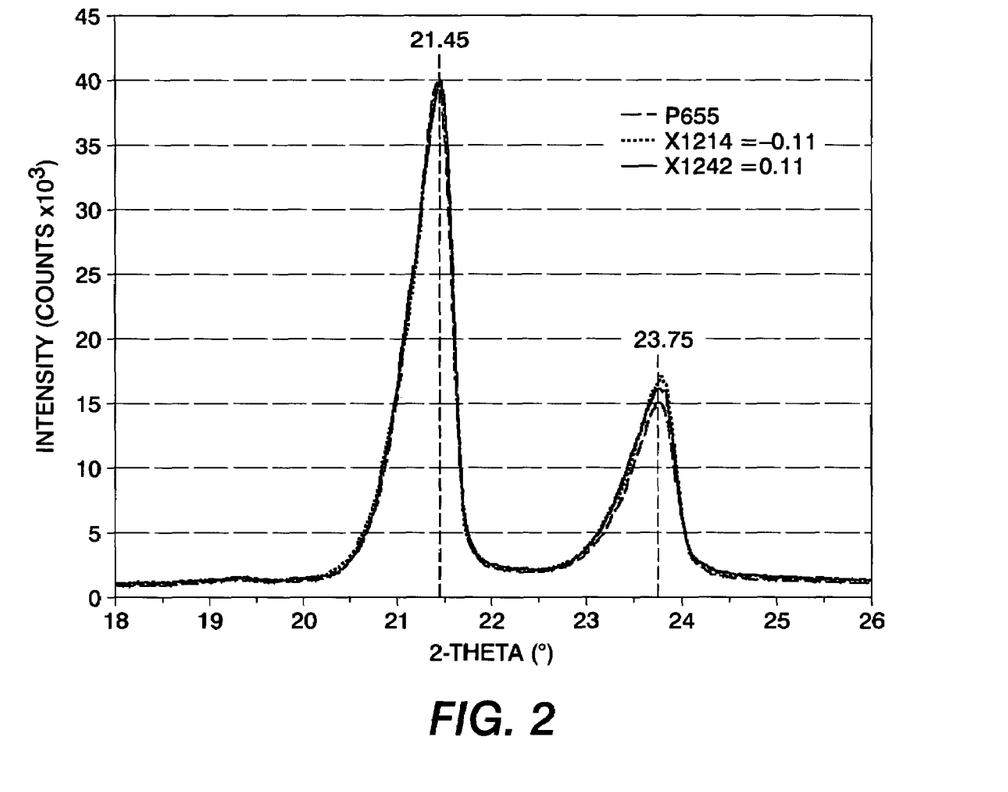
FIG. 2 is an x-ray diffraction of intensity versus 2-Theta (°) for a wax in accordance with an embodiment disclosed herein.

Three samples of waxes were tested for degree of crystallinity using X-ray diffraction. The samples were Polywax 655, X1214 and X1242 (all three are crystalline polyethylene waxes from Baker Petrolite). The waxes had a degree of crystallinity as measured by X-ray diffraction (Xc) of from about 55 to about 100 percent crystallinity using a Rigaku Miniflex instrument, manufactured by Rigaku Corporation. The instrument was fitted with a Cu-target and operated at a tube voltage of 3 KV with a tube current output of 30 mA. The measurement range was between 5° 2-theta to about 35° 2-theta. It is clear that the two sharp peaks, which appear at about 21.5° 2-theta and about 23.7° 2-theta (see FIG. 2 and Table 2), are attributed to the high degree of crystallinity since no broadening of the peaks are observed, which is typically associated with amorphous part of the wax. The degree of crystallinity was calculated by calculating/integrating the intensity counts under the peaks (21.5 and 23.7° 2-theta). The degree of crystallinity (Xc) for the distilled/undistilled wax was found to be greater than 85 percent as measured by an x-ray diffraction equipment as stated above, and was calculated as follows:

$$Xc=[Sc/(Sc+Sa)]\times 100\%$$

wherein Sc is the diffraction peak area of crystalline component from both peaks, represented by 2 high intensity sharp peaks at 21.5° 2-theta and about 23.7° 2-theta, and Sa is the diffraction peak area of amorphous component, represented by a very broad low intensity peak encompassing an area at the base of the 2 crystalline peaks. The total area, in x-ray counts per second, cps, is obtained for the crystalline peaks and the amorphous peak and put into the equation in FIG. 2 to obtain percent crystallinity.

TABLE 2

| @ 2-Theta | Area under peak, cps | Intensity, % of max. |
|---|---|---|
| P 655 Powder Crystallinity = 96% | | |
| 21.4 ($Sa_1$) | 42230 | 3 |
| 23.8 ($Sc_1$) | 328280 | 60 |
| 21.5 ($Sc_2$) | 721456 | 100 |
| X 1214 Crystallinity = 98% | | |
| 22.0(Sa) | 16800 | 3 |
| 21.6($Sc_1$) | 687814 | 100 |
| 23.9($Sc_2$) | 317821 | 60 |
| X1242 Crystallinity = 87% | | |
| 21.8(Sa) | 111574 | 6 |
| 21.4($Sc_1$) | 523221 | 100 |
| 23.7($Sc_2$) | 211054 | 50 |

Example 4

Testing of Wax for Viscosity

The viscosity of the wax was measured using a temperature sweep conducted at 2° C./min, as measured on a Rheometric Scientific RFS 3 fluids spectrometer equipped with a Peltier cell and using the cone and plate geometry at a nominal gap of 53 microns and a 0.04 radians, 50 mm cone. Mathematically, the viscosity—temperature relationship can be represented by:

$$\eta(cp) \leq 10^{27-0.25T} \text{ where } \leq 92° C. \, T \leq 100° C.$$

FIG. 3 represents the useful coalescence temperature ranges as well as the viscosity ranges. The experimental procedure was a Dynamic Temperature Steps test. The test was started at an initial temperature of 100° C. followed by a decrease in temperature to 84° C. and back to 100° C. in 2° C. steps. The soak time between each temperature step was 150 seconds to allow for temperature equilibration. The strain amplitude was varied to maintain the data within the operating limits of the transducer. The equation defines the slope and what the viscosity of the wax for a given coalescence temperature should be. For example, if the coalescence temperature was 94° C., then using the above equation, viscosity (cp) of the wax is calculated to be $\leq 103.5$. And hence the fit of the slope.

Example 5

Measuring for Carbon Units

Solutions of wax were prepared by dissolving from about 40 to about 60 mG of wax into 15 mL of warm (80° C.) toluene. This solution was injected warm (80° C.) using a hot syringe. Alkane distribution identification was obtained by injecting alkane mixes of C13, 15, 20, and 36.

GC Conditions: Hewlett Packard HP6890

Oven: 50° C. for 1 minute, 15° C./min to 400° C., hold 10 min

FID Detector: 425° C.

Column: MXT®-1 Silcosteel-treated steel column (6 m×0.28 mm id, 0.1 μm film thickness).

Injector: Gerstel Cooled programmable CIS4 Injection System

Initial temp: 10° C., hold 0.1 min, ramp at 12° C./ms to 400° C. Hold 1 minute

Split flow 60 mL/min

Column pressure: 5 psi, constant pressure

Autosampler: Gerstel MPS2 Multipurpose Sampler with heated syringe

Syringe temperature 85° C.

Injection volume: 5 μL

The results are reported in FIG. 4. Additional information such as the molecular properties using the above procedure in reported on Table 3.

TABLE 3

| Lot | X-1214 | X-1240 |
|---|---|---|
| AS Number | 505393 | 505394 |
| Mw | 649.2 | 626.3 |
| Mn | 639.1 | 617.0 |
| MWD | 1.02 | 1.02 |
| Mp | C46 | C44 |
| Mp | 646 | 618 |

| Lot | X-1242 | X-1244 |
|---|---|---|
| AS Number | 505395 | 505396 |
| Mw | 654.2 | 656.5 |
| Mn | 644.1 | 644.0 |
| MWD | 1.02 | 1.02 |
| Mp | C48 | C48 |

It will be appreciated that various of the above-discussed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A distilled crystalline wax having from about 30 to about 62 carbon units, a degree of crystallinity as calculated by heat of melting and as measured by DSC of from about 55 to about 100 percent, a Mw of from about 500 to about 800, and a polydispersity (Mw/Mn) of from about 1 to about 1.05.

2. The wax of claim 1, wherein said degree of crystallinity is from about 60 to about 98 percent.

3. The wax of claim 2, wherein said degree of crystallinity is from about 70 to about 95 percent.

4. The wax of claim 3, wherein said degree of crystallinity is from about 75 to about 90 percent.

5. The wax of claim 1, wherein said wax has from about 42 to about 55 carbon units.

6. The wax of claim 1, wherein said wax has a viscosity of from about 10 to about 10,000 centipoise at 92° C.

7. The wax of claim 6, wherein said wax has a viscosity of less than about 100 centipoise at 100° C.

8. The wax of claim 1, wherein said wax comprises a material selected from the group consisting of polyethylene, polypropylene, paraffin, Fischer-Tropsch, microcrystalline wax, carnauba wax, jojoba wax, rice wax, beeswax, montanic acid ester wax, castor wax, and mixtures thereof.

9. The wax of claim 8, wherein the wax comprises polyethylene.

10. The wax of claim 1, wherein said wax has a needle penetration point of from about 0.1 to about 10 dmm.

11. The wax of claim 10, wherein said wax has a needle penetration point of from about 0.5 to about 8 dmm.

12. The wax of claim 11, wherein said wax has a needle penetration point of from about 1 to about 5 dmm.

13. The wax of claim 1, wherein said Mw is from about 600 to about 750.

14. The wax of claim 13, wherein said Mw is from about 640 to about 725.

15. The wax of claim 1, wherein said wax has an Mn and an Mp both in the range of from about 500 to about 800.

16. The wax of claim 15, wherein said Mn and Mp are both from about 600 to about 750.

17. The wax of claim 16, wherein said Mn and Mp are both from about 640 to about 725.

18. The wax of claim 1, wherein all three of Mw, Mn and Mp are from about 640 to about 725.

19. The wax of claim 1, wherein said wax has an onset melt temperature of from about 65 to about 70° C.

20. The wax of claim 19, wherein said wax has an onset melt temperature of from about 95 to about 100° C.

21. A distilled crystalline wax having from about 30 to about 62 carbon units, a degree of crystallinity as calculated by heat of melting and as measured by DSC of from about 55 to about 100 percent, an Mw, Mn and Mp all three in the range of from about 640 to about 725, and a polydispersity of from about 1 to about 1.05.

22. A distilled crystalline wax having from about 30 to about 62 carbon units, a viscosity of from about 100 to about 10,000 centipoise at 92° C., a degree of crystallinity as calculated by heat of melting and as measured by DSC of from about 55 to about 100 percent, an Mw, Mn and Mp all three in the range of from about 640 to about 725, and a polydispersity of from about 1 to about 1.05.

* * * * *